(No Model.)
J. W. HYATT.
ART OF FILTERING WATER.
No. 293,883. Patented Feb. 19, 1884.
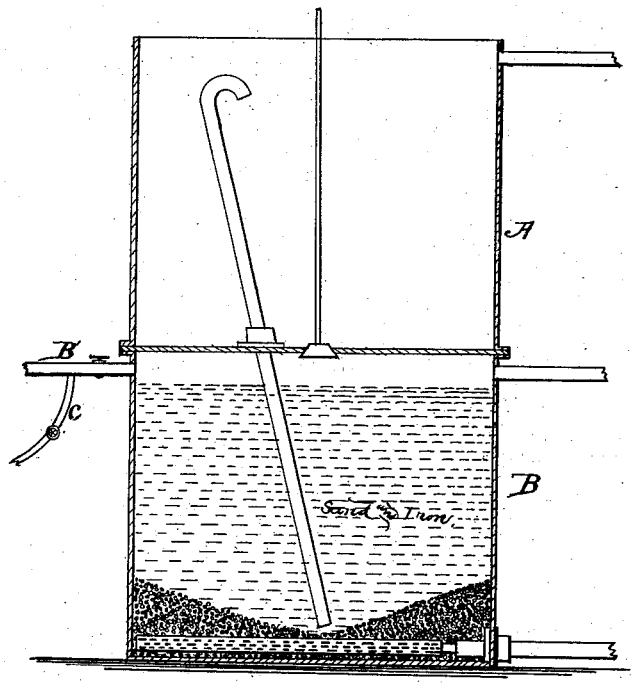
WITNESSES:
INVENTOR
John W. Hyatt,
BY
Chas. O. Gill
ATTORNEY

UNITED STATES PATENT OFFICE.

JOHN W. HYATT, OF NEWARK, NEW JERSEY.

ART OF FILTERING WATER.

SPECIFICATION forming part of Letters Patent No. 293,883, dated February 19, 1884.

Application filed January 29, 1884. (No model.)

*To all whom it may concern:*

Be it known that I, JOHN W. HYATT, a citizen of the United States, and a resident of Newark, in the county of Essex and State of New Jersey, have invented certain new and useful Improvements in the Art of Filtering Water, of which the following is a specification.

The invention relates to improvements in the art of filtration; and it consists in a method of arresting the impurities from water, which consists in injecting into the unfiltered water, lime or equivalent substance, and then passing the same through a filter-bed composed of metallic iron in comminuted form, or metallic iron and sand mixed.

In the practice of my invention I make use of the apparatus shown and described in my application for Letters Patent filed November 3, 1883, and numbered 110,742, which apparatus is constructed on the principle of the filter patented to me March 6, 1883, by Letters Patent No. 273,542. I show a simple form of said apparatus in the accompanying drawing, in which A B denote the upper and lower compartments of the filter, B' the supply-pipe for unfiltered water, and C a pipe through which lime or equivalent substances may be injected into the water during its flow to the filter. The water passes into the filter from a regular source of supply through the pipe B', and during its flow thence the lime or equivalent substance is injected therein. The water which enters the filter passes at once through the bed of filtering material, lettered D, composed of metallic iron in comminuted form and sand mixed, which effectually arrests the impurities, the iron being prevented from passing off in solution with the water by the lime.

In lieu of the use of lime in the process above described, I may employ, if desired, as equivalent substances, any alkaline carbonate or bicarbonate, or caustic alkali. I prefer to make use of the lime in a semi-liquid consistency, which condition may be attained by grinding or pulverizing the same in water.

What I claim as my invention, and desire to secure by Letters Patent, is—

In the art of filtration, the method hereinbefore described of coagulating and arresting the impurities, and of preventing any of the coagulating material from passing off in solution with the filtered water, which method consists in introducing lime or equivalent substance into the unfiltered water, and then passing it through a filter-bed containing metallic iron in comminuted form.

Signed at New York, in the county of New York and State of New York, this 28th day of January, A. D. 1884.

JOHN W. HYATT.

Witnesses:
CHAS. C. GILL,
HERMAN GUSTOW.